US010498514B2

(12) United States Patent
Berggren et al.

(10) Patent No.: US 10,498,514 B2
(45) Date of Patent: Dec. 3, 2019

(54) TRANSMITTING DEVICE, RECEIVING DEVICE AND METHODS THEREOF

(71) Applicant: Huawei Technologies Co., Ltd., Shenzhen (CN)

(72) Inventors: Fredrik Berggren, Kista (SE); Fan Wang, Shanghai (CN); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/700,779

(22) Filed: Sep. 11, 2017

(65) Prior Publication Data

US 2017/0373812 A1 Dec. 28, 2017

Related U.S. Application Data

(63) Continuation of application No. PCT/EP2015/055216, filed on Mar. 12, 2015.

(51) Int. Cl.
*H04W 4/00* (2018.01)
*H04L 5/00* (2006.01)
(Continued)

(52) U.S. Cl.
CPC ......... *H04L 5/0053* (2013.01); *H04W 56/001* (2013.01); *H04L 5/0007* (2013.01);
(Continued)

(58) Field of Classification Search
CPC ........... H04W 72/042; H04W 72/0413; H04W 72/0406; H04W 72/0446; H04W 72/0453
See application file for complete search history.

(56) References Cited

U.S. PATENT DOCUMENTS

2004/0240376 A1\* 12/2004 Wang .................... H04L 25/022
370/204
2005/0013381 A1\* 1/2005 Suh ........................ H04B 7/068
375/260

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.8.0, pp. 1-83, 3rd Generation Partnership Project, Valbonne, France (Sep. 2009).

(Continued)

*Primary Examiner* — Atique Ahmed
(74) *Attorney, Agent, or Firm* — Leydig, Voit & Mayer, Ltd.

(57) ABSTRACT

The present invention relates to a transmitting device and a receiving device. The transmitting device comprises: a processor, and a transmitter; wherein the processor is configured to map a plurality of synchronization signal sequences to time and frequency resource elements of one Orthogonal Frequency Division Multiplex, OFDM, symbol, wherein the transmitter is configured to transmit a multi-carrier signal comprising the one OFDM symbol. The receiving device comprises: a processor, and a receiver; wherein the receiver is configured to receive a multi-carrier signal comprising a OFDM symbol, wherein time and frequency resource elements of the OFDM symbol comprises a plurality of synchronization signal sequences, wherein the processor is configured to detect the plurality of synchronization signal sequences comprised in the time and frequency resource elements of the OFDM symbol.

16 Claims, 12 Drawing Sheets

(51) Int. Cl.
*H04W 56/00* (2009.01)
*H04L 27/26* (2006.01)
*H04W 74/08* (2009.01)

(52) U.S. Cl.
CPC ........... *H04L 27/26* (2013.01); *H04L 27/2611* (2013.01); *H04W 74/0808* (2013.01)

(56) References Cited

U.S. PATENT DOCUMENTS

| | | | | |
|---|---|---|---|---|
| 2006/0240780 | A1* | 10/2006 | Zhu | H04W 74/0808 455/63.4 |
| 2010/0034305 | A1* | 2/2010 | Popovic | H04J 13/0062 13/62 |
| 2010/0182903 | A1* | 7/2010 | Palanki | H04L 1/0041 370/225 |
| 2011/0190011 | A1 | 8/2011 | Choi et al. | |
| 2013/0051373 | A1* | 2/2013 | Ro | H04W 56/00 370/336 |
| 2013/0259009 | A1 | 10/2013 | Berggren et al. | |
| 2014/0169327 | A1* | 6/2014 | Chun | H04W 56/0015 370/330 |
| 2015/0023331 | A1 | 1/2015 | You et al. | |
| 2017/0238272 | A1* | 8/2017 | You | H04J 11/0073 370/350 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V12.4.0, pp. 1-124, 3rd Generation Partnership Project, Valbonne, France (Dec. 2014).

"On UE synchronization in LTE LAA," 3GPP TSG-RAN WG1 Meeting #79 R1-145002, 3rd Generation Partnership Project, Valbonne, France (Nov. 17-21, 2014).

* cited by examiner

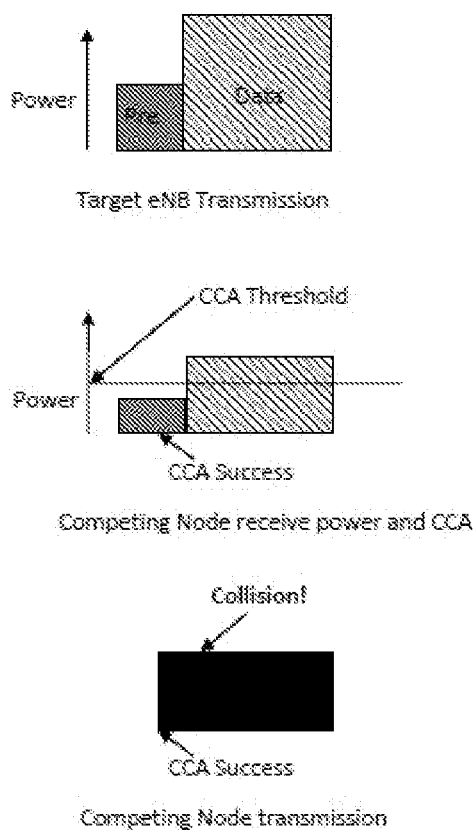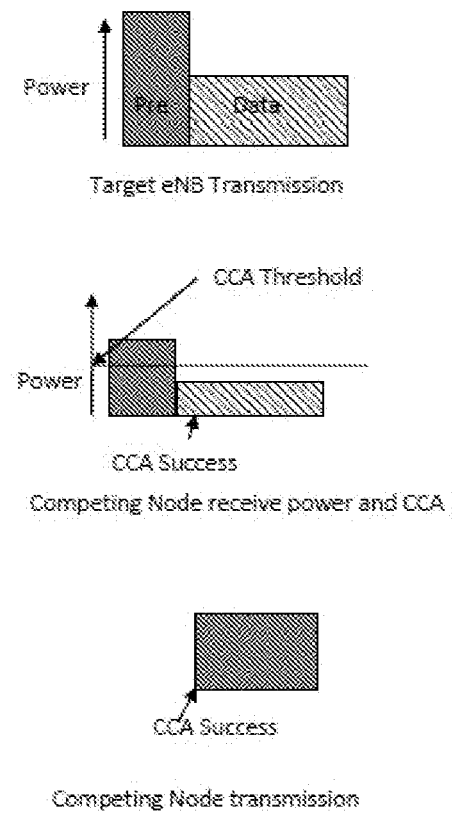
Fig. 5a                          Fig. 5b

TRANSMITTING DEVICE, RECEIVING DEVICE AND METHODS THEREOF

CROSS-REFERENCE TO RELATED APPLICATIONS

This application is a continuation of International Application No. PCT/EP2015/055216, filed on Mar. 12, 2015, the disclosure of which is hereby incorporated by reference in its entirety.

TECHNICAL FIELD

Embodiments of the present invention relate to a transmitting device and a receiving device. Furthermore, embodiments of the present invention also relate to corresponding methods, a multicarrier wireless communication system comprising such a transmitting device, a computer program, and a computer program product.

BACKGROUND

The 3rd Generation Partnership Project (3GPP) started a Release 13 Long Term Evolution Advanced (LTE-Advanced) study item, Licensed Assisted Access (LAA), aiming to use the unlicensed spectrum based on LTE technologies, on which WiFi is currently deployed. LAA carrier is always carrier aggregated with a licensed carrier where LAA carrier is a secondary carrier and the licensed carrier is a primary carrier. It is observed that LTE significantly impacts WiFi performance in LTE-WiFi coexistence case, if current LTE functionalities are assumed. One major reason is that WiFi follows Listen-Before-Talk (LBT) principle, which specifies that a WiFi Node can only start transmitting after it has performed Clear Channel Assessment (CCA) and measured that the channel is idle, while a legacy LTE Node does not perform CCA and may transmit continuously. The continuous transmission from LTE may make the WiFi nodes always measure there are other Nodes transmitting, i.e. collision happens, and the WiFi nodes tend to transmit with significantly less possibilities, resulting in degraded performance. To ensure fair co-existence with WiFi, LTE needs to be modified to also support LBT on the unlicensed band.

To ensure fair co-existence with WiFi, it is agreed for LAA to support LBT and discontinuous transmission as well as limited maximum transmission duration on a carrier in the unlicensed band. The LAA eNodeB can only start transmission when the channel is clear as measured by Clear Channel Assessment (CCA). After a transmission of limited maximum duration, the LAA eNodeB needs to release the channel and perform CCA again to use the channel, resulting in opportunistic transmission with maximum transmission time of around 13 ms for Load Based Equipment (LBE) and 10 ms for Frame Based Equipment (FBE). The gap length between two transmissions could be variable and is affected by other transmitting Nodes, e.g. WiFi Nodes and LAA eNodeBs.

For LBE, CCA is minimum 20 µs, extended CCA (eCCA) duration is a random factor N multiplied by the CCA time, where N is randomly selected in the range 1 ... q every time, q=4 ... 32, and Channel Occupancy Time is $<=(13/32) \times q$ ms. For FBE, CCA is minimum 20 µs and performed in the end of IDLE period, Channel Occupancy Time is 1 ms at minimum and 10 ms at maximum, IDLE period is Minimum 5% of channel occupancy time and Fixed Frame Period=Channel Occupancy Time+IDLE Period.

A fundamental procedure in a cellular wireless system is synchronization, which is performed by a mobile terminal for obtaining time- and frequency synchronization to a cell in the network and detecting its cell identity. LTE synchronization signals are often transmitted periodically by the base station, e.g., in subframe 0 and subframe 5 for FDD. However, given the opportunistic nature of transmission on the unlicensed band, LAA Nodes following Listen Before Talk (LBT) principle are not able to transmit on the unlicensed band continuously. When an LAA node is allowed to transmit after it succeeds in measuring the channel is idle, the time gap between this transmission and the last transmission could be long, and during the gap the receiving Node is not able to achieve or maintain the time- and frequency synchronization since nothing is transmitted. The synchronization between the transmission Node and the receiving Node could be already lost due to mobility and frequency drift. Typically, a control channel is transmitted before the data channel and contains necessary information for receiving the data. Synchronization will have to be established before the receiving Node is able to demodulate any control channel. Depending on when the transmitting Node has found the channel to be clear, the transmission of a synchronization signal may occur at an instant which is not known to the receiving Node. Therefore, the receiving Node may continuously need to try detecting the synchronization signal.

In LTE, synchronization signals, i.e. Primary Synchronization Signal (PSS) and Secondary Synchronization Signal (SSS), are sent periodically in every radio frame. The UE performs initial synchronization (i.e., identifies a cell) based on PSS/SSS and performs Radio Resource Management (RRM) measurements on the Common Reference Signal (CRS). It may also perform synchronization tracking based on downlink signals, e.g. PSS/SSS, CRS or Channel State Information-RS (CSI-RS). For LAA secondary carriers, initial synchronization may be performed based on the periodic signals as well. One possibility is opportunistic periodic PSS/SSS transmission. That is, the PSS/SSS are transmitted in a set of predefined subframes (e.g., subframe 0 and subframe 5 for FDD) but are only transmitted if the LAA eNodeB measures the channel as clear. In addition, some regions (e.g. using ETSI standards) allow short control signalling transmitted with maximum duty cycle of 5% every 50 ms without the need of CCA. One other possibility is therefore that PSS/SSS are sent with a larger periodicity than 5 ms, e.g. as part of short control signalling. The User Equipment (UE) may perform initial synchronization based on this kind of less frequent synchronization signals. It shall be kept in mind that the synchronization design shall not always assume the existence of short control signalling because it is not globally allowed.

After initial synchronization is achieved, the UE may lose the synchronization to the LAA eNodeB after a transmission gap of uncertain length between the previous transmission and the current transmission. The loss of synchronization may be caused by the oscillator drift and the mobility. Note that the UE may not be able to rely on the primary carrier frequency tracking because the Doppler frequency shift could be quite different on the primary carrier and the secondary carrier due to significantly different carrier frequencies. In addition, the primary carrier downlink timing would be different with the secondary downlink timing in some deployment scenarios, e.g. non-collocated macro LTE eNodeB and LAA eNodeB case. Thus each carrier should transmit the necessary synchronization signals for fine synchronization or synchronization tracking.

Relying only on the periodic synchronization signals for LAA fine synchronization or synchronization tracking could be very inefficient in terms of resource utilization. For example, if the LAA eNodeB measures the channel as clear at a time which is not defined for PSS/SSS transmission, say subframe 1 for FDD, the LAA eNodeB may have to wait for up to 4 ms for PSS/SSS before scheduling data transmission, which is a severe waste of time resource especially considering the limited maximum transmission time on LAA carriers.

Meanwhile, relying on the potential new periodic signals, i.e. synchronization signals sent as part of short control signalling of periodicity of tens of ms, would be even more inefficient as the LAA eNodeB may have to wait for an unreasonably long gap for synchronization signal transmission.

With conventional solutions the LAA receiving Node may not be able to achieve synchronization when the LAA transmitting Node wins the contention/CCA and is ready to transmit, because the LAA transmitting Node may not be able to transmit synchronization signals periodically as in LTE Rel-8. Thus the LAA receiving Node may be prohibited for obtaining synchronization and therefore not be able to receive data instantly.

With conventional solutions there would be a waste of OFDM symbols if there is a time gap between when the transmitting Node wins the contention/CCA and the specified OFDM symbol to carry PSS and SSS. Thus, the spectral efficiency of the system will deteriorate.

SUMMARY

An objective of embodiments of the present invention is to provide a solution which mitigates or solves the drawbacks and problems of conventional solutions.

An "or" in this description and the corresponding claims is to be understood as a mathematical OR which covers "and" and "or", and is not to be understand as an XOR (exclusive OR).

The above and further objectives are solved by the subject matter of the independent claims. Further advantageous implementation forms of the present invention can be found in the dependent claims.

According to a first aspect of the invention, the above mentioned and other objectives are achieved with a transmitting device for a multi-carrier wireless communication system, the transmitting device comprising:
  a processor, and
  a transmitter;
  wherein the processor is configured to map a plurality of synchronization signal sequences to time and frequency resource elements of one Orthogonal Frequency Division Multiplex, OFDM, symbol, wherein at least two of the plurality of synchronization signal sequences are of a first kind;
  wherein the transmitter is configured to transmit a multi-carrier signal comprising the one OFDM symbol.

It should be realised that a plurality of synchronization signal sequences means two or more synchronization signal sequences. Therefore, the case of two synchronization signal sequences mapped to one OFDM symbol is possible.

It should further be realised that the expression "time and frequency resource elements of one OFDM symbol" means the smallest unit containing information in the OFDM symbol, e.g., the modulation symbols used to modulate the subcarriers.

The present transmitting device with the capabilities of mapping at least two of the plurality of synchronization signal sequences of a first kind onto one OFDM symbol and transmit the same a number of advantages are provided.

With the transmitting device of the first aspect, synchronization signal sequences are provided which enable the receiver to be able to achieve instant synchronization prior to any control- or data channel transmission after the LAA transmitting Node measures the channel as clear.

Another advantage is that time and frequency synchronization, as well as cell ID identification, can be performed during a single OFDM symbol or a few consecutive OFDM symbols.

Yet another advantage is reduced overhead in terms of OFDM symbols and therefore resulting in more time resource used for data/control channel transmission.

Yet another advantage is minimum interference variations due to the power of a preamble symbol equal to or similar to that of a data symbol as baseline, and due to preamble transmitted over the entire bandwidth, and therefore resulting in robust CCA measurements and CSI measurements.

Yet another advantage is that the complexity of detecting the signal can be low and the detectors used for detecting synchronization signals on the licensed carrier can be utilized also for the unlicensed carrier.

In a first possible implementation form of a transmitting device according to the first aspect, the plurality of synchronization signal sequences are mapped to the time and frequency resource elements of the one OFDM symbol such that the resulting synchronization signal sequence is centrally symmetric with respect to a carrier frequency of the one OFDM symbol.

Centrally symmetric means that the sequence comprises elements, e.g., fulfilling $d[k]=d[k]$ where $k-k$ is different for different $k$. For example, $d[k]=d[N-k]$ is a centrally symmetric sequence for $k=1, 2, \ldots, N-1$.

A synchronization signal sequence mapped to subcarriers is centrally symmetric with respect to a carrier frequency of one OFDM symbol if for any non-zero modulation symbol of the synchronization signal sequence mapped to one subcarrier, there is a same modulation symbol of the synchronization signal sequence mapped to anther subcarrier where the one subcarrier and the another subcarrier are symmetrically located around the carrier frequency, or the DC subcarrier.

With the first possible implementation form, low complexity detection of the one OFDM symbol at the receiver is possible, while using a receiving device detecting the signal of the resulting synchronization signal sequence, or using a receiving device detecting the signal of each of the synchronization signal sequences.

In a second possible implementation form of a transmitting device according to the first possible implementation form of the first aspect or to the first aspect as such, each one of the at least two synchronization signal sequences of the first kind is centrally symmetric.

A synchronization signal sequence mapped to subcarriers is centrally symmetric around a certain frequency, if for any non-zero modulation symbol of the synchronization signal sequence mapped to one subcarrier, there is a same modulation symbol of the synchronization signal sequence mapped to another subcarrier where the one subcarrier and the another subcarrier are symmetrically located around a certain frequency.

In an alternative to the second possible implementation form each one of the at least two synchronization signal sequences of the first kind is mapped to the time and frequency resource elements of the one OFDM symbol such that the resulting synchronization signal sequence is centrally symmetric.

With the second possible implementation form low complexity detection of the synchronization signal sequence of the first kind at the receiving device is possible.

In a third possible implementation form of a transmitting device according to the first or second possible implementation forms of the first aspect or to the first aspect as such, the at least two synchronization signal sequences of the first kind are Primary Synchronization Signal, PSS, sequences or derived from PSS sequences, or Secondary Synchronization Signal, SSS, sequences or derived from SSS sequences.

Derived from PSS sequence or SSS sequence includes any form of cyclic shift, extension, truncation or concatenation of a PSS or SSS sequence. It may also include changing certain parameters used for generating the sequence, such as root indices or pseudo-random generator states. It may also include linear transformations of PSS or SSS sequences, such as multiplication of a constant, a vector or a matrix.

With the third possible implementation form of using PSS sequences and/or SSS sequences the receiver complexity can be held even lower. Also backwards compatibility with LTE systems is possible.

In a fourth possible implementation form of a transmitting device according to any of the preceding possible implementation forms of the first aspect or to the first aspect as such, wherein each one of the at least two synchronization signal sequences of the first kind is mapped to a number of inconsecutive time and frequency resource elements; or wherein each one of the at least two synchronization signal sequences of the first kind is mapped to a number of consecutive time and frequency resource elements; or wherein at least one of the at least two synchronization signal sequences of the first kind is mapped to a number of inconsecutive time and frequency resource elements, and at least one another of the at least two synchronization signal sequences of the first kind is mapped to a number of consecutive time and frequency resource elements.

With the fourth possible implementation form, it is possible to map a sequence in the central part of the carrier, i.e., around the DC subcarrier using an inconsecutive mapping. Similarly, it is possible to utilize all subcarriers for sequences being mapped not around the DC subcarrier using a consecutive mapping.

In a fifth possible implementation form of a transmitting device according to any of the preceding possible implementation forms of the first aspect or to the first aspect as such, at least one another of the plurality of synchronization signal sequences is of a second kind.

With the fifth possible implementation form, additional form of synchronization could be provided for the receiving device, including subframe and/or radio frame timing. Additionally, cell-specific information could be provided using synchronization signal sequences is of a second kind.

In a sixth possible implementation form of a transmitting device according to any of the preceding possible implementation forms of the first aspect or to the first aspect as such, wherein synchronization signal sequences of the first kind are the same or different synchronization signal sequences of the first kind; or
wherein synchronization signal sequences of the second kind are the same or different synchronization signal sequences of the second kind.

With the sixth possible implementation form, it is possible to improve the detection performance by using signal properties from different sequences, e.g., providing better auto-correlation functions. Additionally, more cell-specific information could be encoded using different sequences.

In a seventh possible implementation form of a transmitting device according to any of the preceding possible implementation forms of the first aspect or to the first aspect as such, wherein the one OFDM symbol is transmitted before another OFDM symbol used for transmitting control channels or data channels.

With the seventh possible implementation form, synchronization can be provided prior to any control or data channel transmission, without requiring any form of periodic synchronization signal.

In an eighth possible implementation form of a transmitting device according to any of the preceding possible implementation forms of the first aspect or to the first aspect as such, each one of the at least two synchronization signal sequences of the first kind or each one of the synchronization signal sequences of the second kind indicates cell-specific information.

Cell cell-specific information may include cell identities, cell-specific parameters associated with generating reference signals, and the like.

With the eighth possible implementation form, the receiving device could achieve synchronization to multiple cells.

According to a second aspect of the invention, the above mentioned and other objectives are achieved with a receiving device for a multi-carrier wireless communication system, the receiving device comprising:
a processor, and
a receiver;
wherein the receiver is configured to receive a multi-carrier signal comprising a OFDM symbol, wherein time and frequency resource elements of the OFDM symbol comprises a plurality of synchronization signal sequences, and wherein at least two of the plurality of synchronization signal sequences are of a first kind;
wherein the processor is configured to detect the plurality of synchronization signal sequences comprised in the time and frequency resource elements of the OFDM symbol.

A number of advantages are provided by the present receiving device having the capabilities of receiving the above mentioned multicarrier signal and detect the plurality of synchronization signal sequences.

One advantage is low-complex implementations of the synchronization signal sequence detector(s) in the receiving device. Because of the properties of the OFDM symbol in the multicarrier symbol simple detector devices and algorithms may be used.

Another advantage is better detection performance due to increasing the transmitted energy as a consequence of using multiple sequences per OFDM symbol.

In a first possible implementation form of a receiving device according to the second aspect, each one of the plurality of synchronization signal sequences indicates cell-specific information; and
wherein the processor further is configured to derive the cell-specific information from the plurality of synchronization signal sequences.

With the first possible implementation form, the receiver may be able to identify the cell on which it is performing the synchronization.

In a second possible implementation form of a receiving device according to the first possible implementation form of the second aspect or to the second aspect as such, the plurality of synchronization signal sequences are mapped to the time and frequency resource elements of the OFDM symbol such that the resulting synchronization signal sequence is centrally symmetric with respect to a carrier frequency of the OFDM symbol, or each one of the plurality of synchronization signal sequences is centrally symmetric.

With the second possible implementation form even lower detection complexity is possible in the receiving device.

Embodiments of the present invention also relates to a multicarrier wireless communication system comprising at least one transmitting device according to the first aspect and at least in receiving device according to the second aspect.

According to a third aspect of the invention, the above mentioned and other objectives are achieved with a method for a multi-carrier wireless communication system, the method comprising the steps of:

mapping a plurality of synchronization signal sequences to time and frequency resource elements of one Orthogonal Frequency Division Multiplex, OFDM, symbol, wherein at least two of the plurality of synchronization signal sequences are of a first kind; and transmitting a multi-carrier signal comprising the one OFDM symbol.

In a first possible implementation form of a method according to the third aspect, the plurality of synchronization signal sequences are mapped to the time and frequency resource elements of the one OFDM symbol such that the resulting synchronization signal sequence is centrally symmetric with respect to a carrier frequency of the one OFDM symbol.

In a second possible implementation form of a method according to the first possible implementation form of the third aspect or to the third aspect as such, each one of the at least two synchronization signal sequences of the first kind is centrally symmetric.

In a third possible implementation form of a method according to the first or second possible implementation forms of the third aspect or to the third aspect as such, the at least two synchronization signal sequences of the first kind are Primary Synchronization Signal, PSS, sequences or derived from PSS sequences, or Secondary Synchronization Signal, SSS, sequences or derived from SSS sequences.

In a fourth possible implementation form of a method according to any of the preceding possible implementation forms of the third aspect or to the third aspect as such, wherein each one of the at least two synchronization signal sequences of the first kind is mapped to a number of inconsecutive time and frequency resource elements; or wherein each one of the at least two synchronization signal sequences of the first kind is mapped to a number of consecutive time and frequency resource elements; or wherein at least one of the at least two synchronization signal sequences of the first kind is mapped to a number of inconsecutive time and frequency resource elements, and at least one another of the at least two synchronization signal sequences of the first kind is mapped to a number of consecutive time and frequency resource elements.

In a fifth possible implementation form of a method according to any of the preceding possible implementation forms of the third aspect or to the third aspect as such, at least one another of the plurality of synchronization signal sequences is of a second kind.

In a sixth possible implementation form of a method according to any of the preceding possible implementation forms of the third aspect or to the third aspect as such, wherein synchronization signal sequences of the first kind are the same or different synchronization signal sequences of the first kind; or wherein synchronization signal sequences of the second kind are the same or different synchronization signal sequences of the second kind.

In a seventh possible implementation form of a method according to any of the preceding possible implementation forms of the third aspect or to the third aspect as such, wherein the one OFDM symbol is transmitted before another OFDM symbol used for transmitting control channels or data channels.

In an eighth possible implementation form of a method according to any of the preceding possible implementation forms of the third aspect or to the third aspect as such, each one of the at least two synchronization signal sequences of the first kind or each one of the synchronization signal sequences of the second kind indicates cell-specific information.

According to a fourth aspect of the invention, the above mentioned and other objectives are achieved with a method for a multi-carrier wireless communication system, the method comprising the steps of:

receiving a multi-carrier signal comprising a OFDM symbol, wherein time and frequency resource elements of the OFDM symbol comprises a plurality of synchronization signal sequences, and wherein at least two of the plurality of synchronization signal sequences are of a first kind; and detecting the plurality of synchronization signal sequences comprised in the time and frequency resource elements of the OFDM symbol.

In a first possible implementation form of a method according to the fourth aspect, each one of the plurality of synchronization signal sequences indicates cell-specific information; and wherein the processor further is configured to derive the cell-specific information from the plurality of synchronization signal sequences.

In a second possible implementation form of a method according to the first possible implementation form of the fourth aspect or to the fourth aspect as such, the plurality of synchronization signal sequences are mapped to the time and frequency resource elements of the OFDM symbol such that the resulting synchronization signal sequence is centrally symmetric with respect to a carrier frequency of the OFDM symbol, or each one of the plurality of synchronization signal sequences is centrally symmetric.

The advantages of the methods according to the third or fourth aspects are the same as those for the corresponding transmitting device and receiving device according to the first and second aspects.

The present invention also relates to a computer program, with a program code, which when runs by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which:

FIGS. 5*a* and 5*b* illustrate competing network node behavior in the case of target LAA eNodeB transmission with unequal power;

DETAILED DESCRIPTION

Without loss of generality, consider the following representation of a sampled OFDM symbol (without cyclic prefix)

$$s_u[k] = \frac{1}{\sqrt{N}} \sum_{n=0}^{N-1} H_u[n] W_N^{-kn}, k = 0, 1, \ldots, N-1$$

$$W_N = \exp\left(-\frac{j2\pi}{N}\right), j = \sqrt{-1}$$

where $H_u$ are the Fourier coefficients to which synchronization signal sequences are mapped. In LTE, the PSS and SSS sequence lengths (i.e., length 62) were chosen to fit into the smallest supported LTE bandwidth (i.e., 1.4 MHz or 6 Physical Resource Blocks (PRBs) comprising 72 subcarriers) and the PSS and SSS are transmitted in different OFDM symbols.

In LTE, the PSS is generated in order to enable low-complex receiver implementations. A centrally symmetric number sequence $d_u[n]$, n=0, 1, ..., L−1, where L is odd (i.e., it is 63), has its central element n=(L−1)/2 punctured. The punctured number sequence is mapped to a set of discrete Fourier frequency coefficients $H_u[l]$, l=0, 1, ..., N−1, such that the Fourier coefficients are symmetric around l=0, i.e., $Hu[1+p]=H_u[1-p]=H_u[1-p+N]$, where p is an integer and where the last equality follows from the periodicity of the discrete Fourier transform. The mapping can thus be described by $$H_u[l] = \begin{cases} 0, & l = 0 \\ d_u\left[l + \frac{L-1}{2}\right], & l = 1, 2, \ldots, \frac{L-1}{2} \\ d_u\left[l - N + \frac{L-1}{2}\right], & l = N - \frac{L-1}{2}, \ldots, N-1 \\ 0, & \text{elsewhere} \end{cases}$$

When generating the continuous time-domain base-band signal, the discrete frequency l=0 corresponds to the DC subcarrier, i.e., the center frequency of the carrier. By this construction, the discrete time-domain baseband PSS becomes centrally symmetric, $s_u[k]=s_u[N-k]$, k=1, 2, ..., N−1. In the receiver, this symmetry property can be used in a matched filter implementation (i.e., received samples are multiplied by the transmitted signal) to reduce the complexity, e.g. reducing the number of complex valued multiplications. The symmetry property could also be used for detectors based on auto-correlation receivers (i.e., where there is no matched filter but received samples are multiplied), e.g., a correlation value could be computed by utilizing the central symmetry as $\rho(\Delta)=\Sigma_{n+0}^{N-1} r(n+\Delta)r^*(N-n+\Delta)$.

The LTE system also contains a Secondary Synchronization Signal (SSS), which is typically detected after synchronization has been established by detecting the PSS. The SSS is constructed from a set of m-sequences in order to be detected in the frequency domain with low-complexity based methods, e.g., based on the Fast Hadamard Transform.

Figure 1:
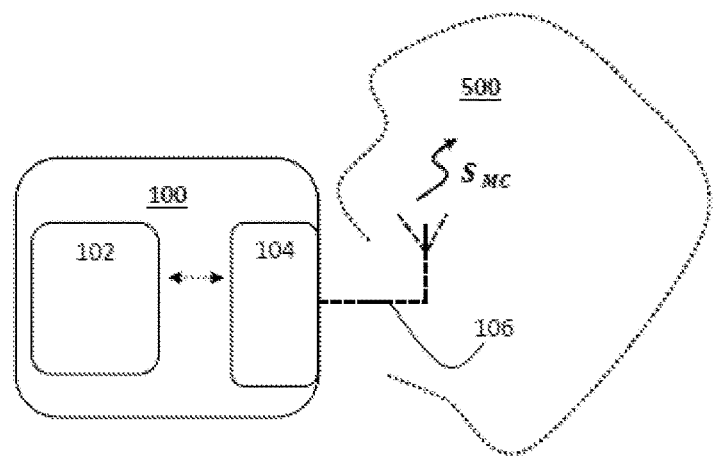
FIG. 1 shows a transmitting device according to an embodiment of the present invention.

FIG. 1 shows a transmitting device 100 according to an embodiment of the present invention. The transmitting device 100 comprises a processor 102 and a transmitter 104 (e.g. part of a transceiver) as shown in FIG. 1. The processor 102 is communicably coupled with the transmitter 104 with suitable communication means (illustrated with the dashed arrow) known in the art. The transmitter 104 is in this particular example further coupled to an antenna device 106 configured for wireless communications in the multicarrier wireless communication system 500. The antenna device 106 is illustrated with dashed lines in FIG. 1. The wireless communications may be according to suitable communication standards, such as e.g. 3GPP standards.

The processor 102 of the transmitting device 100 is configured to map a plurality of synchronization signal sequences to time and frequency resource elements of one OFDM symbol. At least two, of the plurality of synchronization signal sequences, are of a first kind. The one OFDM symbol is forwarded to the transmitter 104 via of the communication means. The transmitter 104 of the transmitting device 100 receives the one OFDM symbol and is configured to transmit a multi-carrier signal $S_{MC}$ comprising the one OFDM symbol in the multicarrier wireless communication system 500. The multicarrier signal $S_{MC}$ is in the example in FIG. 1 transmitted via the antenna device 106 of the transmitting device 100.

Figure 2:
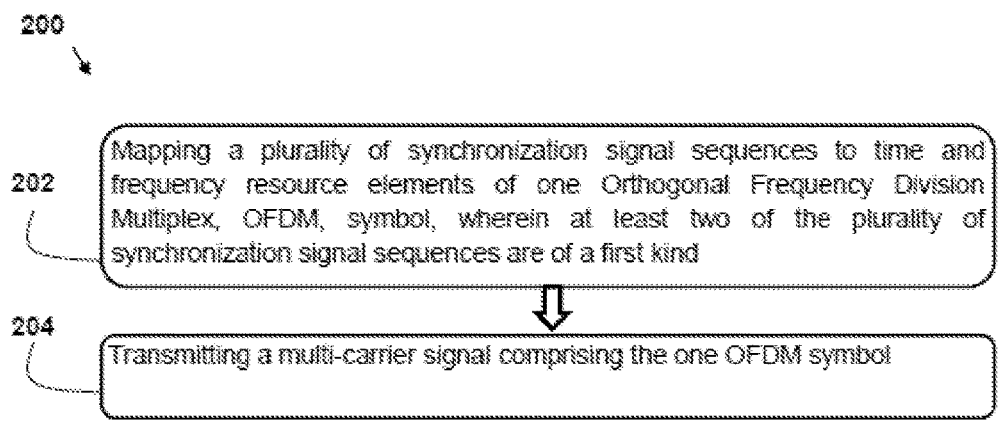
FIG. 2 shows a method according to an embodiment of the present invention.

FIG. 2 shows a corresponding method 200 according to an embodiment of the present invention. The method 200 may be executed in a transmitting device 100, such as the one shown in FIG. 1. The method 200 comprises the step of mapping 202 a plurality of synchronization signal sequences to time and frequency resource elements of one OFDM symbol in which at least two of the plurality of synchronization signal sequences are of a first kind. The method 200 further comprises the step of transmitting 204 a multi-carrier signal $S_{MC}$ comprising the one OFDM symbol in the multicarrier wireless communication system 500.

Figure 3:
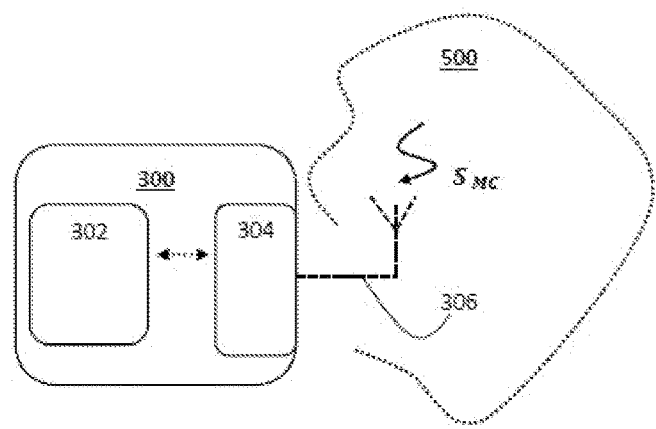
FIG. 3 shows a receiving device according to an embodiment of the present invention.

FIG. 3 shows a receiving device 300 according to an embodiment of the present invention. The receiving device 300 comprises a processor 302 and a receiver 304 (e.g. part of a transceiver). The processor 302 is communicably coupled with the receiver 304 with communication means (illustrated with the dashed arrow) known in the art. The receiver 304 is further coupled to an antenna device 306 configured for wireless communications in the multicarrier wireless communication system 500. The antenna device 306 is illustrated with the dashed lines in FIG. 3. The wireless communications may be according to suitable communication standards, such as e.g. 3GPP standards.

The receiver 304 is configured to receive a multicarrier signal $S_{MC}$ comprising a OFDM symbol. The time and frequency resource elements of the OFDM symbol comprise a plurality of synchronization signal sequences, and at least two of the plurality of synchronization signal sequences are of a first kind. The multicarrier signal $S_{MC}$ has been transmitted by the transmitting device 100. In the example in FIG. 3, the multicarrier signal $S_{MC}$ is received by using the antenna device 306. The processor 302 of the receiving device 300 is configured to detect the plurality of synchronization signal sequences comprised in the time and frequency resource elements of the OFDM symbol. After detection of the plurality of synchronization signal sequences the processor 302 may use the detected synchronization signal sequences for further processing, such as synchronization, cell identification, etc.

Figure 4:
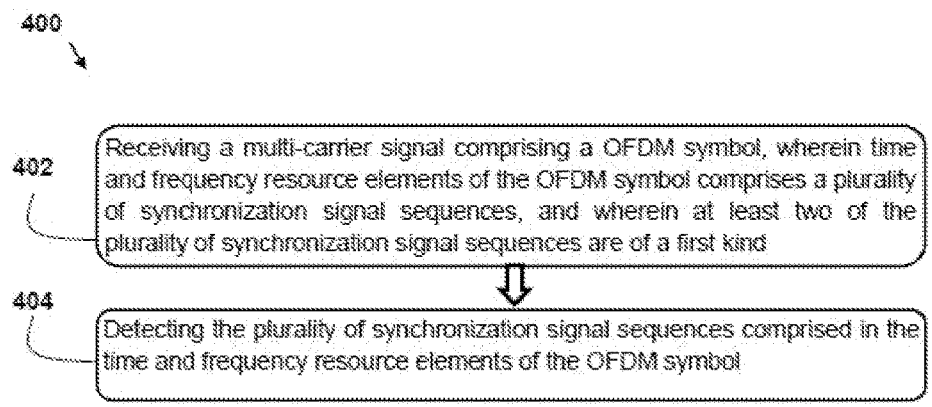
FIG. 4 shows a further method according to an embodiment of the present invention.

FIG. 4 shows a corresponding method 400 according to an embodiment of the present invention. The method 400 may be executed in a receiving device 300, such as the one shown in FIG. 3. The method 400 comprises the step of receiving 402 a multi-carrier signal comprising a OFDM symbol. The time and frequency resource elements of the OFDM symbol comprise a plurality of synchronization signal sequences, and at least two of the plurality of synchronization signal sequences are of a first kind. The method 400 further comprises the step of detecting 404 the plurality of synchronization signal sequences comprised in the time and frequency resource elements of the OFDM symbol. The method 400 may include further steps of processing.

The transmitting device 100 and the receiving device 300 can be any suitable communication devices having the capabilities and being configured to transmit and receive multicarrier signals, respectively, in wireless communication systems. It should further be noted that the transmitting device 100 and the receiving device 300 generally also comprises other means, units, elements, devices, etc., such that the transmitting device 100 and the receiving device 300 have the mentioned capabilities. Examples of such means, units, elements, and devices are given in the following description.

Further embodiments of the present invention consider two or more kinds (or types) of synchronization signal sequences mapped to the one OFDM symbol, i.e. synchronization signal sequences of a first kind and synchronization signal sequences of a second kind.

For example, the first kind of synchronization signal sequences could be PSS sequences and the second kind of synchronization signal sequences could be SSS sequences. The synchronization signal sequences of the first kind and/or synchronization signal sequences of the second kind are (frequency) multiplexed in the same one OFDM symbol. The first kind of synchronization signal sequences may be detected in order to facilitate at least time-domain synchronization on OFDM symbol level. The second kind of synchronization signal sequences may include information such that the receiver can obtain additional time synchronization such as subframe- or radioframe synchronization. The first and second kind of synchronization signal sequences may contain cell-specific information.

In a further embodiment of the present invention the synchronization signal sequences of the first kind are PSS sequences and/or derived from PSS sequences.

In a further embodiment of the present invention the synchronization signal sequences of the second kind are SSS sequences and/or derived from SSS sequences.

In a further embodiment of the present invention the synchronization signal sequences of the first kind are SSS sequences and/or derived from SSS sequences.

In a further embodiment of the present invention the synchronization signal sequences of the second kind are PSS sequences and/or derived from PSS sequences.

In a further embodiment of the present invention, each synchronization signal sequence of the first kind is centrally symmetric in respect of a carrier frequency of the one OFDM symbol.

In a further embodiment of the present invention, a synchronization signal sequence of the first and/or the second kind is not centrally symmetric but the mapping to the subcarriers of at least two such synchronization signal sequences is made such that the resulting sequence (and hence signal) becomes centrally symmetric around a carrier frequency of the multicarrier signal.

In a further embodiment of the present invention, the signal generated from at least two synchronization signal sequences of the first kind or at least two synchronization signal sequences of the second kind is centrally symmetric.

In a further embodiment of the present invention, the signal generated from at least one synchronization signal sequence of the first kind and at least one synchronization signal sequence of the second kind is centrally symmetric.

In a further embodiment of the present invention, only parts of a synchronization signal sequence of the first kind and/or parts of a synchronization signal sequence of the second kind is multiplexed in one OFDM symbol.

In a further embodiment of the present invention, synchronization signal sequences of the first kind and/or the second kind are mapped onto 62 consecutive subcarriers without un-modulated DC subcarrier.

In a further embodiment of the present invention, different synchronization signal sequences of the first kind and/or synchronization signal sequences of the second kind are multiplexed in one OFDM symbol. The different synchronization signal sequences of the first kind and/or synchronization signal sequences of the second kind may be used for encoding cell-specific information as well as frame- or subframe timing.

In the following description the terminology and communication standard may refer to 3GPP LTE of different releases. It should however be noted that embodiments of the present invention is not limited to such standards or wireless communication systems. Further, the expressions "LAA transmitting Node(s)" or "LAA eNodeB" or "WiFi transmitting Node(s)" in the following description are examples of the present transmitting device 100.

Embodiments of the present invention may relate to the generation of synchronization signal sequences for LAA transmitting Nodes winning the contention/CCA by frequency multiplexing PSS sequences and/or SSS sequences within one OFDM symbol (e.g., a preamble) and transmit one or several such OFDM symbols prior to OFDM symbols for control- or data channel transmission.

As agreed in 3GPP, LAA supports at least 20 MHz system bandwidth option in the 5 GHz band and system bandwidths <5 MHz are not considered. Therefore 5 MHz, 10 MHz, 15 MHz and 20 MHz system bandwidth should be considered for LAA. Since LAA system bandwidth is at least 5 MHz, i.e. 25 Physical Resource Blocks (PRB) and PSS/SSS fits into 6 PRBs (1.08 MHz) or effectively 62 subcarriers, there is sufficient frequency resource to multiplex PSS and SSS in the frequency domain. This is in contrast to the LTE system, where the minimum bandwidth is 1.4 MHz, which makes it impossible to multiplex multiple synchronization signal sequences within one OFDM symbol.

Frequency multiplexing of synchronization signal sequences of the first kind and/or synchronization signal sequences of the second kind within one OFDM symbol provides the advantage of transmitting the preamble for synchronization over the entire bandwidth or the same bandwidth as data symbol and with the same or similar power as data symbol, which is analyzed below.

For LAA operation, it is essential to avoid transmission collisions among the transmitting Nodes. One unexpected situation is that one LAA eNodeB starts transmission but during the transmission period other competing LAA eNodeB or WiFi transmitting Nodes also are allowed to transmit while the received power at the competing Node side is above CCA threshold. This may happen if the transmitting LAA eNodeB is using different transmit power during the transmission period.

One example is that the target LAA eNodeB transmits preamble symbols for synchronization with lower power than data symbols as illustrated in FIG. 5a. As shown in the figure, this implies that the received power of the preamble at the competing Node is lower than the received power of the data. In this case other competing Nodes may measure the channel as clear in the target LAA eNodeB preamble phase while in fact the power level received from the target LAA eNodeB during the data transmission phase would be higher causing the channel not to be clear. Consequently the competing Nodes start transmission during the target eNodeB data transmission phase and collision of data transmissions and/or preambles among the target eNodeB and competing Node occurs.

The other example is that target LAA eNodeB transmits preamble symbols for synchronization with higher power than data symbols as illustrated in FIG. 5b. As shown in the figure, this implies that the received power of the preamble at the competing Node is higher than the received power of the data. In this case other competing Nodes may measure the channel as busy in the target LAA eNodeB preamble phase while clear in the data phase. This power setting would be less inefficient than the previous example as it will not cause collision. However, it is still not preferable because if the preamble symbol power is set exactly the same as data symbol power, the competing nodes actually may be able to measure the channel as clear in the preamble phase and starts transmission earlier with the LBT principle fulfilled.

Therefore equal or at least close to equal power allocation during LAA transmission would be preferred to avoid unexpected transmission collision from competing LAA eNBs or WiFi transmitting Nodes and to increase overall system capacity with the LBT principle fulfilled.

Figure 6:
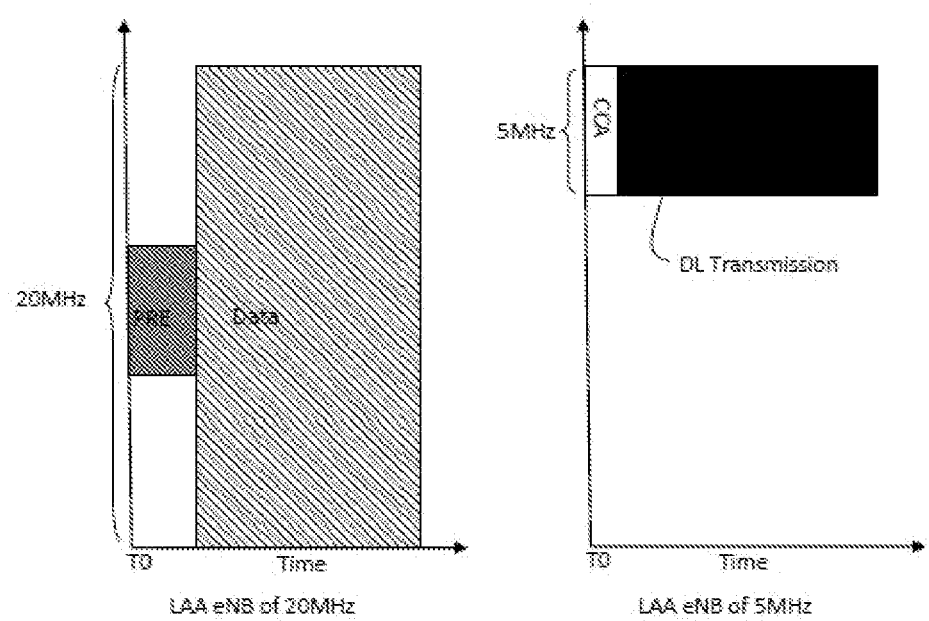
FIG. 6 illustrates the problem of partial bandwidth preamble in LAA eNodeB of different bandwidth co-existence case.

One issue related to preamble frequency allocation is how much bandwidth should be utilized, i.e. partial bandwidth or the entire bandwidth. Partial bandwidth transmission results in higher Power Spectral Density (PSD) in a certain range of frequency and empty power in other certain range of frequency. Unequal power between data and preamble in frequency domain may occur since the data transmission is assumed to be over the entire bandwidth. This may further result in transmission collision for the co-existence case of LAA eNodeBs with different bandwidth. Specifically, as shown in FIG. 6, if the target LAA eNodeB of 20 MHz bandwidth transmits a partial bandwidth preamble, say 5 MHz (illustrated in the left drawing in FIG. 6), a competing LAA eNodeB of 5 MHz bandwidth may mistakenly measure the channel as clear over a 5 MHz bandwidth assuming the target eNB does not transmit anything for preamble. The competing LAA eNodeB will start transmission when it is actually not allowed since the received power level from the target eNodeB is strong in the data transmission period, i.e. collision occurs (illustrated in the right drawing in FIG. 6).

Equal power allocation for the preamble in the frequency domain helps to maintain constant interference level also over frequency, which is especially helpful for co-existence of LAA eNodeBs with different bandwidths and also for CSI measurements. The inter-cell interference caused by preamble will tend to be evenly distributed over the frequency, which helps to reduce inter-cell interference variation over the frequency domain. Therefore, the inter-cell interference caused by preamble and data will tend to be similar as it follows similar distribution over the frequency, which helps to reduce inter-cell interference variation over the time domain. Neighbor cell users, when measuring CSI, will get more robust CSI measurements due to reduced inter-cell interference variation over the frequency domain and time domain.

Therefore, frequency multiplexing of PSS and/or SSS sequences within an OFDM symbol, and repetition of PSS and/or SSS over the frequency domain, help to transmit the preamble for synchronization over the entire bandwidth or the same bandwidth as data symbol and with the same or similar power as data symbol, which further results in reduced transmission collision and increased overall system capacity.

Figure 7:
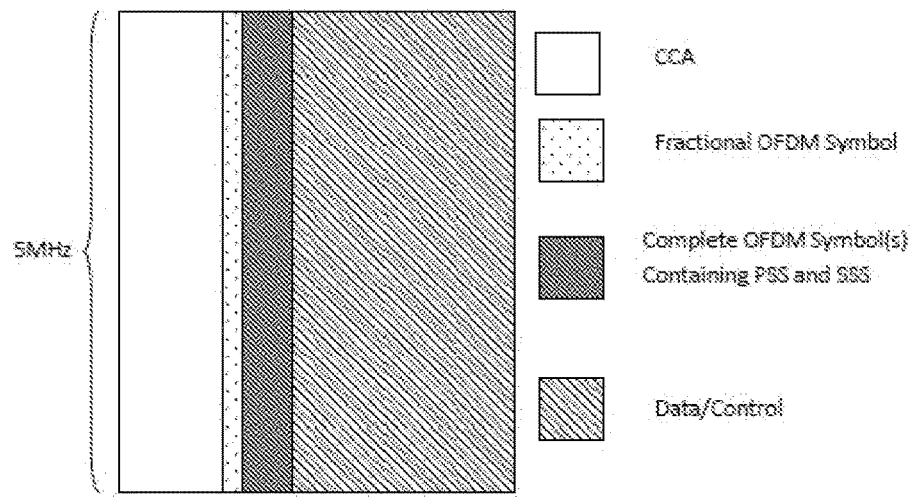
FIG. 7 illustrates LAA OFDM symbol carrying PSS and SSS.

One example of transmitting one OFDM symbol containing PSS sequences and SSS sequences is given in FIG. 7, where the LAA transmitting Node, after it wins the contention/CCA, first transmits some reservation signals in the fractional OFDM symbol to reserve the channel, and then transmits one complete symbol containing the preamble for the receiving Node to achieve synchronization and cell ID identification, wherein PSS and SSS is generated from Rel-8 to Rel-12 primary synchronization signal sequence and secondary synchronization sequence. The reason why the fractional OFDM symbol is needed is because the LAA transmitting Node may win the contention/CCA at a time not exactly the OFDM symbol boundary and at that time the LAA transmitting Node needs to start transmitting to seize the channel in order that other nodes will not be able to measure the channel as idle and will not start a colliding transmission.

Figure 8:
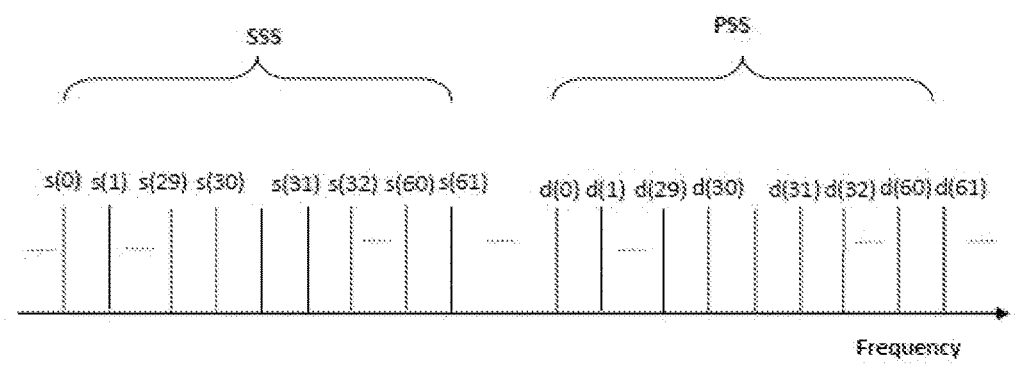
FIG. 8 illustrates frequency multiplexing of PSS and SSS symbols within one OFDM symbol.

A detailed mapping of PSS and SSS sequences d[k] and s[k] onto one OFDM symbol is given in FIG. 8, where PSS and SSS are concatenated in the frequency domain, d[k] is a length-62 frequency-domain Zadoff-Chu sequence used for primary synchronization signal as specified in 3GPP TS36.211 while s[k] is a length-62 sequence used for secondary synchronization signal as specified in 3GPP TS36.211. The entire part containing fractional OFDM symbols and complete symbols containing PSS and SSS before data transmission is also referred as preamble. The preamble is transmitted before control/data symbols and after CCA succeeds. This means that the complete OFDM symbol(s) containing the frequency multiplexed PSS/SSS is only transmitted after a fractional OFDM symbol or after an empty OFDM symbol.

As mentioned the synchronization signal sequences may be derived or obtained by manipulation of the PSS or SSS sequences, including shifts or cyclic shifts of the sequences, truncation, puncturing, using different parameters defining the synchronization signal sequences (e.g., root indices, initialization values of shift registers etc.) and other linear transformations. It would also be possible to use other synchronization signal sequences than those for the PSS and SSS and still obtain the merits of the present invention. For example, it is possible to define other centrally symmetric synchronization signal sequences than the one used for the PSS, which also can generate centrally symmetric signals. One example is to use different root indices for the PSS sequence used by the LAA Node than for a regular eNodeB. This also makes it possible to discriminate the preamble from other signals which utilize the PSS and SSS, e.g., the LAA Node may be transmitting a Discovery Reference Signal (DRS), which contains PSS and SSS.

In one example, synchronization signal sequences of the first kind and/or the second kind are multiplexed in one OFDM symbol, such that the synchronization signal sequences of the first kind and/or the second kind are mapped onto more than 62 subcarriers and onto a frequency range larger than 1.08 MHz in one OFDM symbol. Or equivalently, synchronization signal sequences of the first kind and/or the second kind are multiplexed in one OFDM symbol, such that the synchronization signal sequences of the first kind and/or the second kind are repeated or partially repeated in the frequency domain to allow energy accumulation, wherein any transmission of the same kind synchronization signal in addition to a complete synchronization signal sequences of the first kind and/or the second kind (e.g. length-62 PSS or SSS sequence) can be regarded as "repeated". Preferably, the synchronization signals are transmitted over the entire bandwidth, i.e. in at least a certain frequency granularity of the transmission bandwidth, e.g. every 5 MHz (25 PRBs) or every 1.08 MHz (6 PRBs), there is synchronization signal transmitted.

In yet one example, at least two synchronization signal sequences of the first kind are multiplexed in one OFDM symbol, or synchronization signal sequence of the first kind is transmitted over at least 2*62 subcarriers within one OFDM symbol.

In yet one example, at least two synchronization signal sequences of the first kind and/or the second kind are multiplexed in one OFDM symbol, where one synchronization signal sequence of the first kind and/or the second kind is a complete sequence of length-62 and the other synchronization signal sequence of the first kind and/or the second kind sequence is a sequence of length less than 62.

In yet one example, at least two synchronization signal sequences of the second kind are multiplexed in an OFDM symbol, or synchronization signal sequences of the second kind is transmitted over at least 2*62 subcarriers within one OFDM symbol.

In yet one example, at least one length-62 synchronization signal sequence of the first kind and at least one length-62 synchronization signal sequences of the second kind sequence are multiplexed in one OFDM symbol.

One advantage of multiplexing the synchronization signal sequences of the first kind in one OFDM symbol and synchronization signal sequences of the second kind in another OFDM symbol is that it may give the receiver a larger time-margin to obtain the timing synchronization before proceeding to detect the synchronization signal sequences of the second kind, e.g., if the OFDM symbol containing the synchronization signal sequences of the second kind is located after the OFDM symbol containing the synchronization signal sequences of the first kind. Moreover, in the presence of frequency offset errors, there could occur mutual interference between the signals generated from the two kinds of synchronization signal sequences, if they are multiplexed in the same OFDM symbol. Hence, detection performance may be improved if sequences of different kinds are multiplexed in different OFDM symbols.

One advantage of utilizing synchronization signal sequences which are the same as the PSS and SSS sequences is the ability to perform low-complex preamble detection in the receiving device 300.

The PSS is typically detected in the time-domain by a matched filter, i.e., the received samples r(n) are multiplied with a replica of the transmitted signal, thereby creating a correlation peak at the correct timing $\rho(\Delta) = \Sigma_{n+0}^{N-1} r[n+\Delta] s^*(n+\Delta)$. By adding the centrally symmetric samples r[n] and r[N−n] prior to multiplication with the replica sample s[n], the number of multiplications can be reduced from N to N/2. Embodiments of the present invention allow complexity reduction for several receiver structures. Two exemplary receiver structures are described for detecting the multiplexed PSS sequences in this disclosure.

Figure 9:
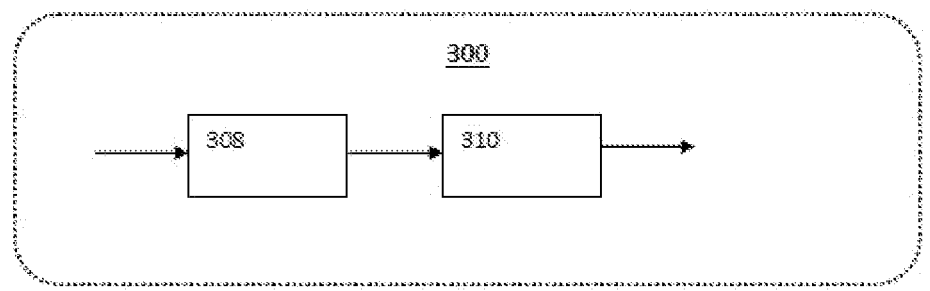
FIG. 9 shows a baseband receiver structure for PSS detector with a matched filter applied to all PSSs.

In FIG. 9 the receiving device 300 comprises a baseband filter 308 coupled to a matched filter 310. The matched filter 310 is applied to the signal generated from all synchronization signal sequences of the first kind. Thus the length of the matched filter 310 has a length at least not being less than the number of subcarriers being modulated by the synchronization signal sequences of the first kind. Optionally, a baseband filter 308 may be applied, whose pass band includes all subcarriers containing the synchronization signal sequences of the first kind.

Suppose that M (m=0, 1, . . . , M−1) synchronization signal sequences of the first kind are multiplexed in an OFDM symbol, each being mapped around a frequency $\delta_m$. Then, at the correct timing, a matched filter 310 of length N produces the output $$\rho = \sum_{n=0}^{N-1} \sum_{m=0}^{M-1} s[n] W_N^{-\delta_m n} \sum_{m=0}^{M-1} s^*[n] W_N^{\delta_m n}$$

$$= M \cdot \sum_{n=0}^{N-1} s[n]s^*[n]$$

since $\Sigma_{n=0}^{N-1} e^{2\pi i n\delta_m/N}=0$. That is, the accumulated energy corresponds to M times to that of a single PSS. For reducing the receiver complexity, it is beneficial if the signal is centrally symmetric. The part of the signal which is generated from the synchronization signal sequence of the first kind is centrally symmetric if there are pairs of frequencies where $\delta_m=-\delta_p$, since each synchronization signal sequence of the first kind is centrally symmetric around the frequency $\delta_m$. Thereby, the sequences are mapped such that the Fourier coefficients are symmetric around frequency k=0.

Therefore, in one further embodiment of the present invention, the synchronization signal sequences of the first kind are mapped to the subcarriers of the one OFDM symbol such that the compound or resulting signal becomes centrally symmetric.

In one example, the pairs of frequencies $\delta_m$ (with the exception of $\delta_m=0$) are chosen to not correspond to any carrier frequency of the system. This is advantageous since it reduces the interference among the synchronization signals among LAA carriers using different carrier frequencies.

Figure 10:
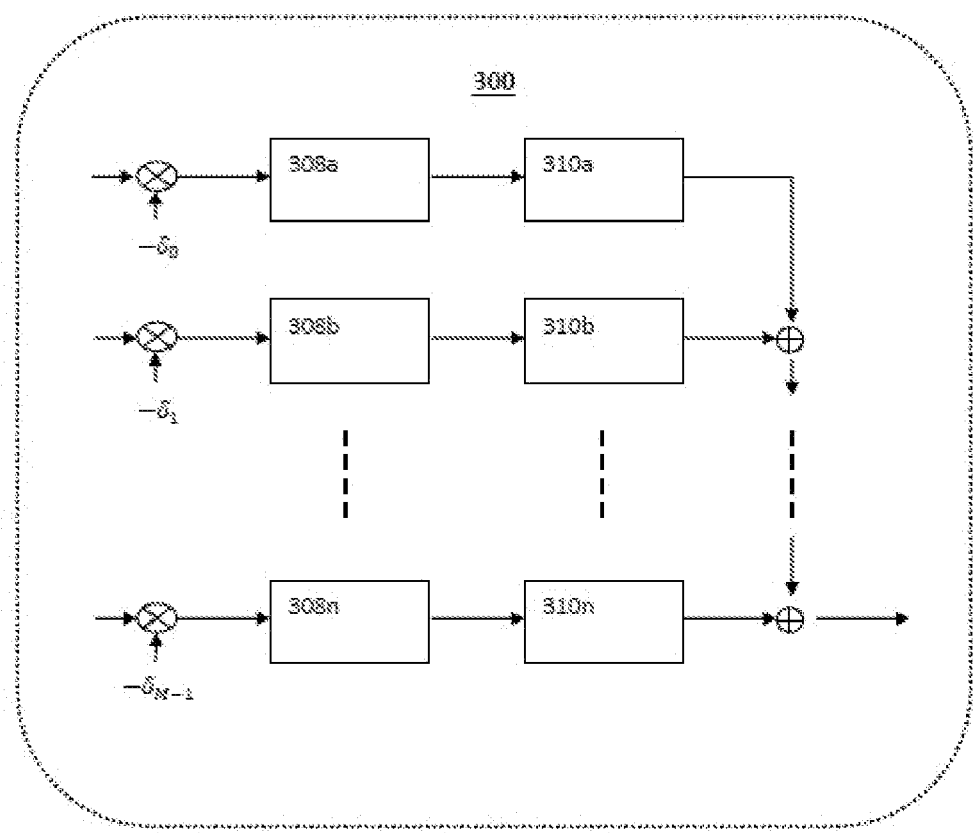
FIG. 10 shows another baseband receiver structure for PSS detector with a matched filter applied to each PSS.

FIG. 10 shows another receiving device 300. The receiving device 300 comprises in this embodiment a plurality of baseband filters 308a, 308b, . . . , 308n coupled to corresponding matched filters 310a, 310b, . . . , 310n. In FIG. 10, a matched filter 310n is used for each synchronization signal sequence of the first kind. Thus the length of the matched filter 310n has a length at least not being less than the number of subcarriers being modulated by a single synchronization signal sequence of the first kind. This would allow for reusing the existing matched filter for the synchronization signal sequence of the first kind, which may lower the cost of the receiver. Prior to the matched filter 310n, the signal is moved in the frequency domain to locate around the center frequency. Thereafter, a corresponding baseband filter 308n is applied whose pass band includes at least the subcarriers containing the synchronization signal sequence of the first kind. Therefore after down-conversion and filtering, only the signal generated from the associated synchronization signal sequence of the first kind remains. It is noted that for such a receiver structure, there is no requirement that the compound signal generated from M>1 synchronization signal sequence of the first kind should be centrally symmetric in order to provide complexity reduction. It is sufficient that each synchronization signal sequence of the first kind is mapped symmetrically around its frequency $\delta_m$.

Figure 11:
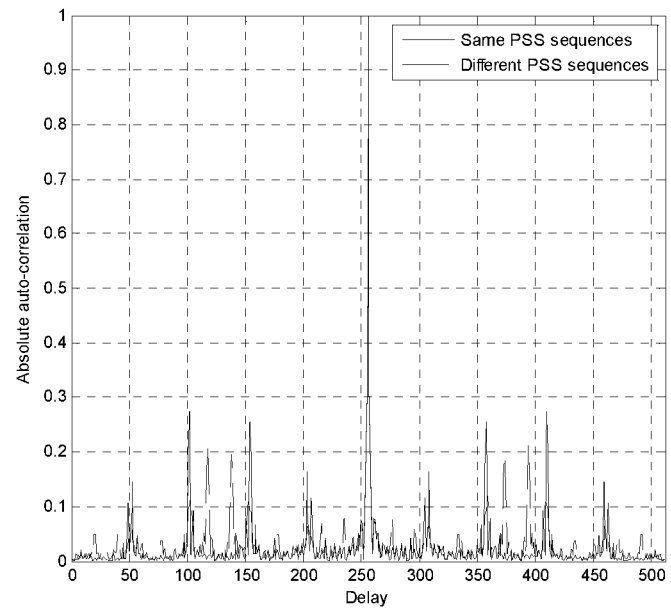
FIG. 11 shows absolute normalized auto-correlation function of a signal generated from 3 PSS sequences.

FIG. 11 shows the absolute normalized auto-correlation function for the receiver in FIG. 9 when M=3 PSS sequences are multiplexed, with a matched filter length of 256. It is also demonstrated that using different PSS sequences (by using different root indices of the sequences) within the OFDM symbol could reduce the sidelobes further. An advantage of using a receiver in FIG. 9, is performance may be improved compared to the receiver shown in FIG. 10, since the length of the matched filter is longer, which provides larger processing gain.

Figure 12:
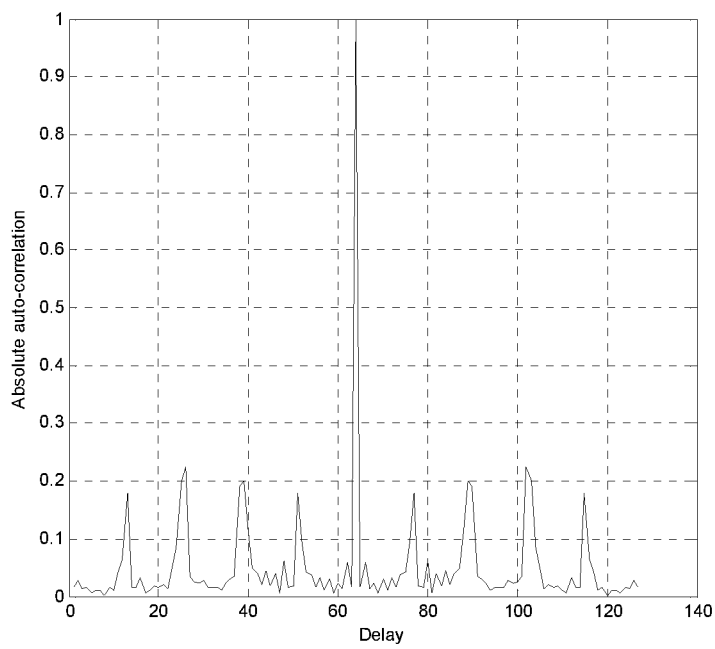
FIG. 12 shows absolute normalized auto-correlation function of a signal generated from 1 PSS sequence.

FIG. 12 shows the absolute normalized auto-correlation function for the receiver in FIG. 10 with a matched filter length of 64 for a signal generated from M=1 PSS sequence. The advantage of using a shorter matched filter is a reduced complexity since fewer complex-valued multiplications are performed. If the synchronization signal sequences from LTE are reused, the receiver complexity is reduced since the same matched filters/receivers could be used on the LAA carrier, which the receiver is already equipped with.

Another example is to multiply the different synchronization signal sequences with different complex-valued (or real-valued) numbers. This may be used to shape the auto-correlation function in a desirable manner. It is noted that a centrally symmetric signal could be obtained after the multiplication by multiplying at least two synchronization signal sequences with the same complex-valued number.

Figure 13:
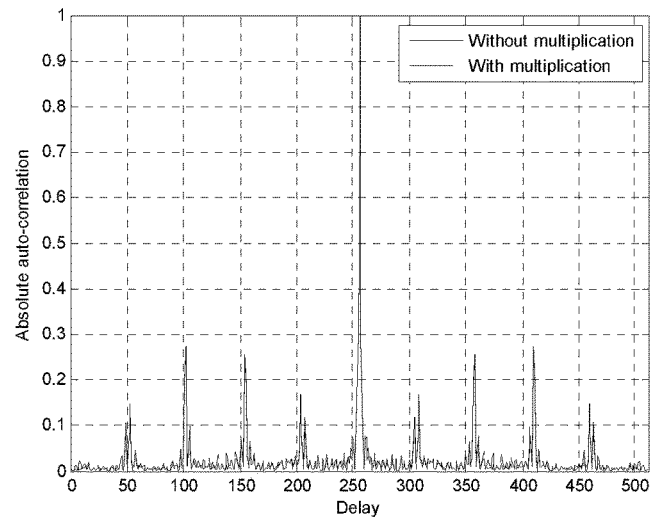
FIG. 13 shows the absolute normalized auto-correlation functions with and without complex-valued multiplication of synchronization signal sequences.

FIG. 13 shows the absolute normalized auto-correlation functions with and without complex-valued multiplication of the sequences. FIG. 13 shows an example using the same PSS sequence multiplexed 3 times in one OFDM symbol where the two outer located sequences are multiplied with the same complex-number. It can be seen that improvement could be achieved by means of lowering the largest sidelobes, e.g., from 0.274 to 0.258 and from 0.256 to 0.240, respectively.

In a further embodiment of the present invention, also the synchronization signal sequences of the second kind (e.g. SSS sequences) are mapped to the subcarriers such that the resulting signal becomes centrally symmetric. An advantage of this is that also the synchronization signal sequences of the second kind could also be used for timing synchronization on sample level (i.e., not only for obtaining frame synchronization) if a detector based on auto-correlation is used, as discussed above. This implies that the synchronization signal sequences of the second kind could be detected in the time-domain when used for timing synchronization, which is in contrast to the conventional solutions where the synchronization signal sequences of the second kind are not assumed to provide for OFDM symbol synchronization. This gives further performance improvement as more signal energy can be accumulated. However, each synchronization signal sequence of the second kind is typically not centrally symmetric around the frequency $\delta_m$. Therefore the synchronization signal sequence of the second kind sequences have to be mapped such that they become centrally symmetric around the frequency k=0. This can be achieved by reversing the sequence when mapped to subcarriers with frequencies k<0 (or k>0). That is, the sequence s[0], s[1], . . . , s[L−1] is mapped around frequency $\delta_m$ and the sequence s[L−1], s[L−2], . . . , s[0] is mapped around frequency $-\delta_m$. Thus, even if the synchronization signal sequence of the second kind is not centrally symmetric by itself, the signal generated from the synchronization signal sequences of the second kind mapped in such a manner, will become centrally symmetric if the number of multiplexed synchronization signal sequences of the second kind is even.

It is realized that several options exist to assure that the whole OFDM symbol carrying synchronization signal sequences of the first kind and synchronization signal sequences of the second kind is symmetric around the carrier frequency. In the following examples PSS sequences and SSS sequences are used but the present solution is not limited hereto.

PSS and SSS is symmetric around the carrier frequency, e.g. [S P S], [P P P], [S P P S], [P S S P], [P P P P], [S S P S S], [P S P S P], [S P P P S], and so on, where P refers to PSS and S refers to SSS. Note that even higher level concatenation of PSS and SSS, i.e. larger than 5, is also included in the present solution.

Figure 14:
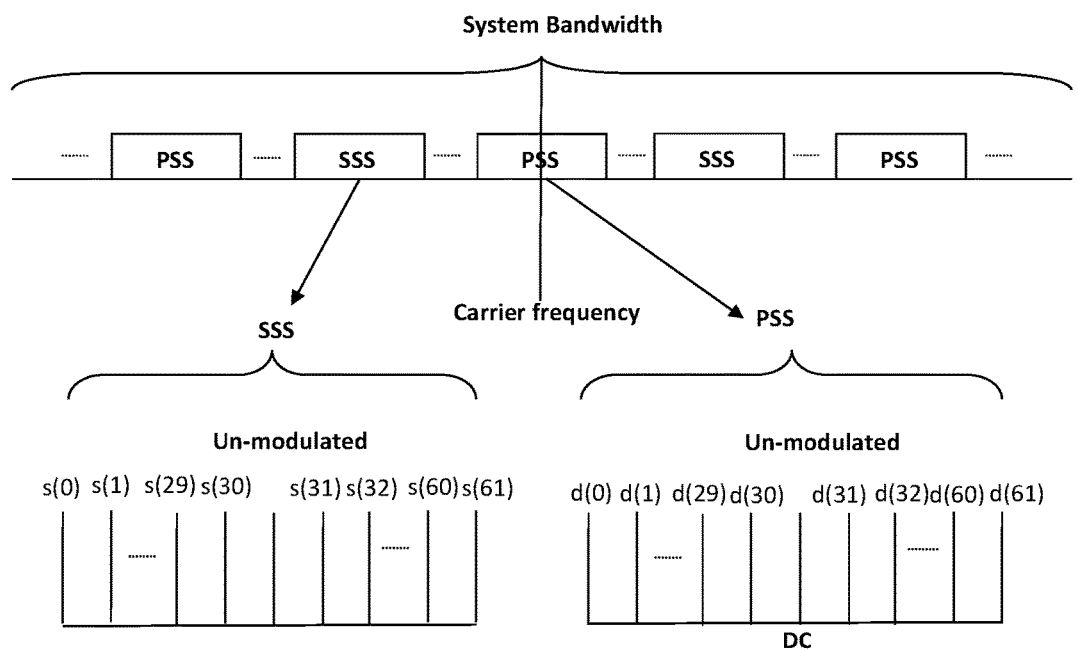
FIG. 14 illustrates centrally symmetry around the LTE carrier frequency for the whole OFDM symbol with the pattern [P S P S P]

An example is illustrated in FIG. 14, where the OFDM symbol contains PSS, SSS, PSS, SSS and PSS from the lowest frequency index to the highest frequency index, and d[k] is a length-62 frequency-domain Zadoff-Chu sequence used for primary synchronization signal as specified in 3GPP TS36.211. Synchronizations signals including PSS and SSS are centrally symmetric around the LTE carrier frequency, or equivalently direct current (DC) subcarrier. The DC subcarrier is not modulated. The SSS sequence is mapped as if it was to be mapped around the DC subcarrier, i.e., it is mapped around an un-modulated central subcarrier which can be achieved by puncturing. This is beneficial since both the PSS and SSS maintain the same mapping as in LTE, which reduces the implementation complexity. Given the centrally symmetric nature of this invention, the implementation complexity can be reduced.

In further embodiments of the present invention, if the synchronization signal sequences of the first kind and the synchronization signal sequences of the second kind are not mapped to the frequency range containing the DC subcarrier, there is no requirement to map the sequences around un-modulated subcarriers. However, such a mapping still maintains the central symmetry of the synchronization signals. This result in synchronization signal sequences of the first kind or synchronization signal sequences of the second kind mapped onto 62 consecutive subcarriers without the un-modulated DC subcarrier.

Figure 15:
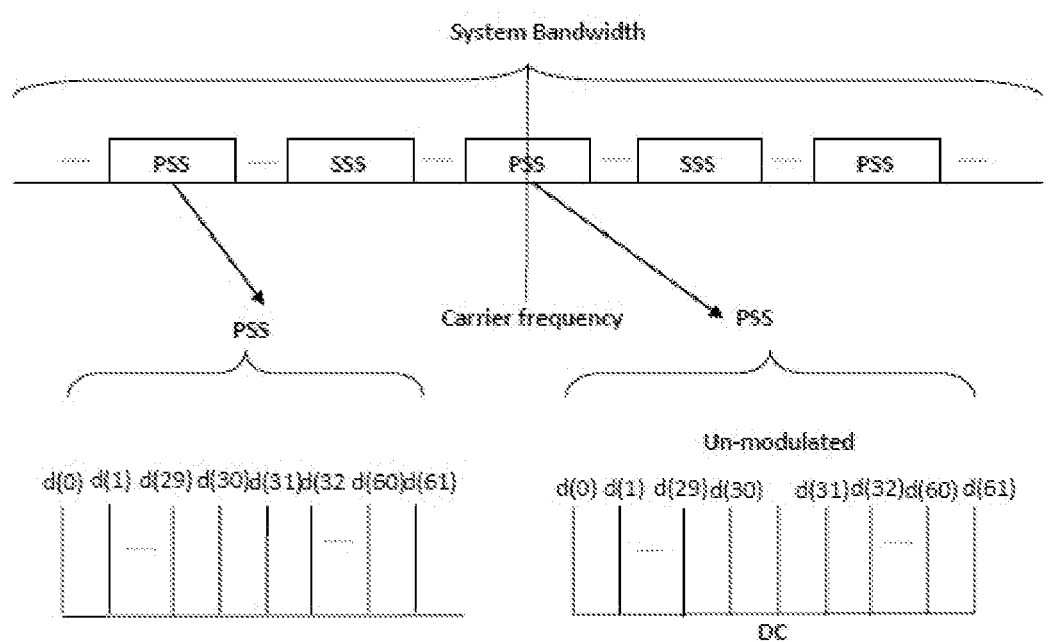
FIG. 15 illustrates sequence mapping for PSS without replicating the un-modulated DC subcarrier.

An example for PSS sequence and mapping in the frequency range not containing the DC subcarrier is given in FIG. 15 where d[k] is a length-62 frequency-domain Zadoff-Chu sequence used for primary synchronization signal as specified in 3GPP TS36.211.

Figure 16:
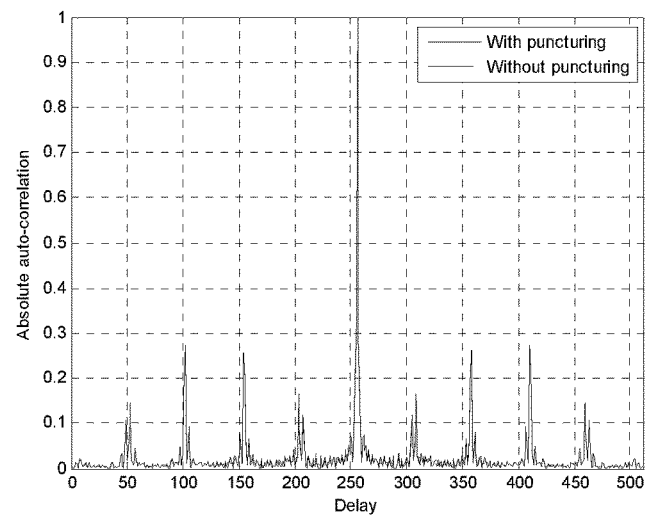
FIG. 16 shows the absolute normalized auto-correlation functions with and without puncturing of the central element of the synchronization signal sequences.

Another example is where the central element of the sequence is not punctured, i.e. the sequence has length 63 and is centrally symmetric. FIG. 16 shows the absolute auto-correlation functions with and without puncturing of the central element of the sequences. FIG. 16 shows the absolute auto-correlation functions using the same PSS sequence multiplexed 3 times in an OFDM symbol. For the centrally located sequence, its central element has to be punctured. However, for the other two sequences, it could be considered not to puncture the central element and instead use the full length-63 sequence. These auto-correlation functions are similar with or without puncturing the central element of the two sequences.

Figure 17:
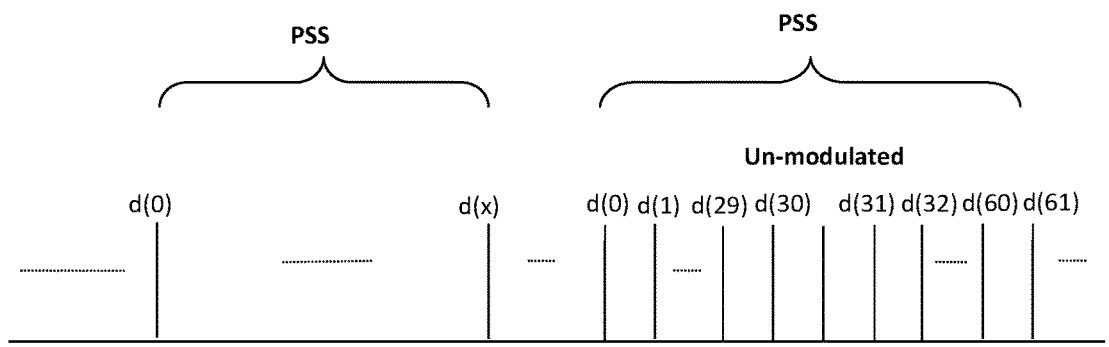
FIG. 17 illustrates repetition of PSS within one OFDM symbol.

Since the multiplexed PSS and SSS sequences may not occupy all available subcarriers, part of a sequence could be transmitted. Thereby, a sequence having length less than 62 is transmitted, which is illustrated in FIG. 17, where d[k] is a length-62 frequency-domain Zadoff-Chu sequence used for primary synchronization signal as specified in 3GPP TS36.211. Such a partial sequence may not be centrally symmetric. However, as explained above for the SSS sequences, it is possible to obtain a centrally symmetric signal by reversing the mapping for positive (or negative) frequencies. FIG. 17 illustrates repetition of PSS within an OFDM symbol, where x<=61. PSS is repeated if x=61 and PSS is partially repeated if x<61.

The at least two synchronization signal sequences being multiplexed within one OFDM symbol could be different, e.g., if both synchronization signal sequences of the first kind and the second kind are used, which are different. Moreover, even for a given kind of synchronization signal sequence the synchronization signal sequences can differ. For example, if multiple PSS sequences are used, each synchronization signal sequence could use a different root index. It is also possible that different SSS sequences are multiplexed.

Using different synchronization signal sequences makes it possible to convey more information in the preamble. For example in LTE a physical-layer cell identity is derived from $N_{ID}^{cell}=3N_{ID}^{(1)}+N_{ID}^{(2)}$ which is uniquely defined by a number $N_{ID}^{(1)}$ in the range of 0 to 167 (detected from the SSS), representing the physical-layer cell-identity group, and a number $N_{ID}^{(2)}$ in the range of 0 to 2 (detected from the PSS), representing the physical-layer identity within the physical-layer cell-identity group. Table 1 is from 3GPP TS 36.211 v8.8.0 and provides how to derive PSS root index from $N_{ID}^{(2)}$.

TABLE 1

| Root indices for the PSS | |
|---|---|
| $N_{ID}^{(2)}$ | Root index u |
| 0 | 25 |
| 1 | 29 |
| 2 | 34 |

Hence, it is realized that more information (e.g., a larger set of cell Identities (IDs), or other additional information) could be carried by the preamble by using different synchronization signal sequences. To provide diversity or indicate more information, e.g. cell-specific information as well as frame- or subframe timing, the same kind of synchronization signals transmitted in the same OFDM symbols, e.g. PSS or SSS, can use different sequences.

Figure 18:
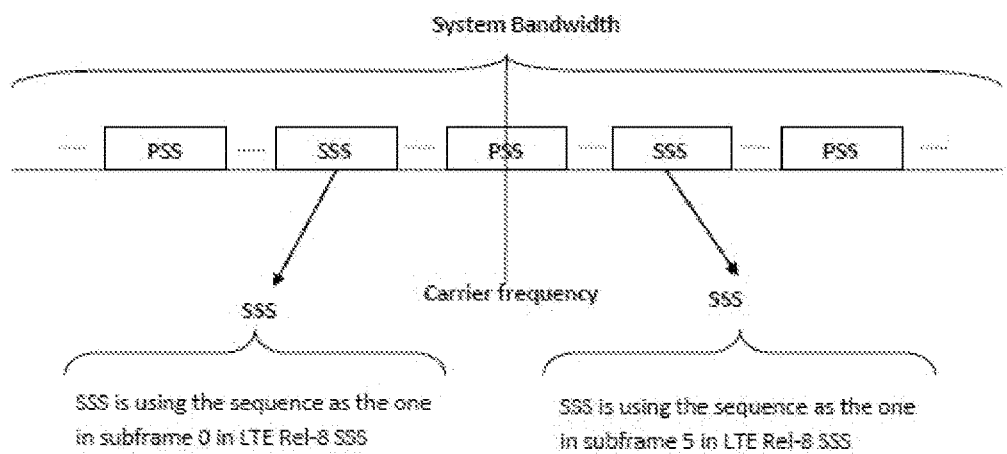
FIG. 18 illustrates SSS transmitted in one OFDM symbol using different sequences.

One example of using different SSS sequence based on the instant the SSS is transmitted is to convey time information. In 3GPP LTE SSS sequence is different in subframe 0 and subframe 5, to convey the radio frame timing. One example is that SSS sequence is the same as the one used in subframe 0 if SSS is transmitted in subframe 0, subframe 1, subframe 2, subframe 3 or subframe 4, and the same as the one used in subframe 5 if SSS is transmitted in subframe 5, subframe 6, subframe 7, subframe 8 or subframe 9. FIG. 18 illustrates SSS transmitted in one OFDM symbol using different sequences.

One anther example of using different SSS sequences within the one OFDM symbol carrying both at least two SSS sequences is shown in FIG. 18, which may be used to provide diversity or indicate more information.

A further embodiment of the present invention comprises transmitting the preamble in at least two OFDM symbols and using the same modulation sequences in at least two OFDM symbols. A merit of this repeated transmission is that it allows means for frequency offset estimation by simple comparison of phase shifts of a same modulation symbol transmitted in different OFDM symbols.

A further embodiment of the present invention comprises transmitting the preamble in at least two OFDM symbols and using at least one synchronization signal sequence being different in at least two OFDM symbols. A merit of this is that the auto-correlation function being computed over the at least two OFDM symbols will have lower sidelobes (since it is known that a repeated signal produces two sidelobes at −3 dB).

Therefore, a preamble in this disclosure may be any OFDM symbol transmitted before data information. The entire part containing fractional OFDM symbols and complete symbols before data transmission is also referred as preamble. The preamble may also be referred to as reservation signal.

Figure 19:
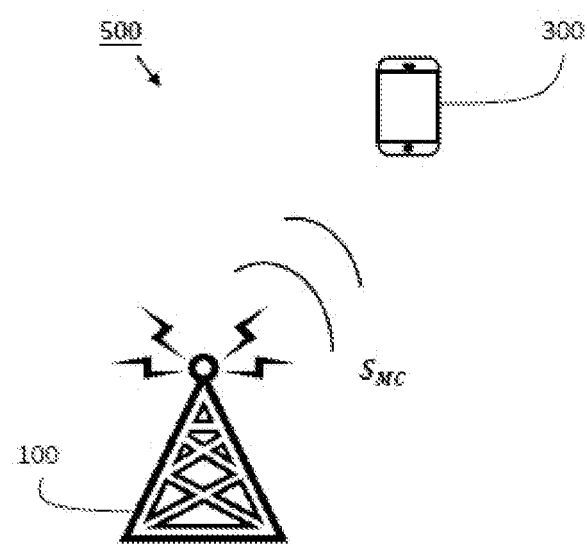
FIG. 19 shows a multicarrier wireless communication system according to an embodiment of the present invention.

FIG. 19 illustrates a multicarrier wireless communication system 500 according to an embodiment of the present invention. The multicarrier wireless communication system 500 comprises at least one transmitting device 100 and at least one receiving device 300. The transmitting device 100 may either be a radio network node or a user node. Consequently, the receiving device 300 may also be a radio network node or a user node.

In FIG. 19 the transmitting device 100 transmits a multicarrier signal $S_{MC}$ comprising one or more OFDM symbols according to embodiments of the present invention. The transmitting device 100 in FIG. 19 is illustrated as a radio network node. A receiving device 300, in this case a user device, receives the multicarrier signal $S_{MC}$. The receiving device 300 demodulates the multicarrier signal and detects two or more synchronization signal sequences in each OFDM symbol. The two or more synchronization signal sequences may be used by the receiving device 300 for synchronization, cell identification, etc.

A radio network node or also called base station, e.g. a Radio Base Station (RBS), may in some radio networks be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a station (STA), which is any device that contains an IEEE 802.11-conformant media access control (MAC) and physical layer (PHY) interface to the wireless medium (WM).

A user device, such as User Equipment (UE) in LTE, mobile station, wireless terminal and/or mobile terminal, is enabled to communicate wirelessly in a wireless communication system, sometimes also referred to as a cellular radio system. The user device may further be referred to as mobile telephones, cellular telephones, computer tablets or laptops with wireless capability. The user device in the present context may be, for example, portable, pocket-storable, hand-held, computer-comprised, or vehicle-mounted mobile devices, enabled to communicate voice and/or data, via the radio access network, with another entity, such as another receiver or a server. The user device can be a station (STA), which is any device that contains an IEEE 802.11-conformant media access control (MAC) and physical layer (PHY) interface to the wireless medium (WM).

Furthermore, any method according to the present invention may be implemented in a computer program, having a program code, which when runs by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present transmitting device 100 and receiving device 300 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, processing means, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. An apparatus for a multi-carrier wireless communication system, the apparatus comprising:
    a processor, and
    a transmitter;
    wherein the processor is configured to map a plurality of synchronization signal sequences to time and frequency resource elements of one Orthogonal Frequency Division Multiplex (OFDM) symbol, such that resulting synchronization signal sequences are centrally symmetric with respect to a carrier frequency of the one OFDM symbol, and wherein at least two of the plurality of synchronization signal sequences are of a first kind, and wherein synchronization signal sequences of the first kind are mapped onto consecutive subcarriers without an un-modulated DC subcarrier; and
    wherein the transmitter is configured to transmit a multicarrier signal comprising the one OFDM symbol.

2. An apparatus according to claim 1, wherein each one of the at least two synchronization signal sequences of the first kind is centrally symmetric.

3. An apparatus according to claim 1, wherein the at least two synchronization signal sequences of the first kind are Primary Synchronization Signal (PSS) sequences or derived from PSS sequences, or Secondary Synchronization Signal (SSS) sequences or derived from SSS sequences.

4. An apparatus according to claim 1,
    wherein each one of the at least two synchronization signal sequences of the first kind is mapped to a number of inconsecutive time and frequency resource elements; or
    wherein each one of the at least two synchronization signal sequences of the first kind is mapped to a number of consecutive time and frequency resource elements; or
    wherein at least one of the at least two synchronization signal sequences of the first kind is mapped to a number of inconsecutive time and frequency resource elements, and at least one another of the at least two synchronization signal sequences of the first kind is mapped to a number of consecutive time and frequency resource elements.

5. An apparatus according to claim 1, wherein at least one another of the plurality of synchronization signal sequences is of a second kind.

6. An apparatus according to claim 5,
    wherein synchronization signal sequences of the first kind are the same or different synchronization signal sequences of the first kind; or wherein synchronization signal sequences of the second kind are the same or different synchronization signal sequences of the second kind.

7. An apparatus according to claim 1, wherein the one OFDM symbol is transmitted before another OFDM symbol used for transmitting control channels or data channels.

8. An apparatus according to claim 1, wherein each one of the at least two synchronization signal sequences of the first kind or each one of the synchronization signal sequences of the second kind indicates cell-specific information.

9. An apparatus for a multi-carrier wireless communication system, the apparatus comprising:
   a processor, and
   a receiver;
   wherein the receiver is configured to receive a multi-carrier signal comprising a Orthogonal Frequency Division Multiplex (OFDM) symbol, wherein time and frequency resource elements of the OFDM symbol comprises a plurality of synchronization signal sequences, and wherein at least two of the plurality of synchronization signal sequences are of a first kind;
   wherein the processor is configured to detect the plurality of synchronization signal sequences comprised in the time and frequency resource elements of the OFDM symbol;
   wherein the plurality of synchronization signal sequences are mapped to the time and frequency resource elements of the one OFDM symbol such that the resulting synchronization signal sequences are centrally symmetric with respect to a carrier frequency of the one OFDM symbol, and wherein synchronization signal sequences of the first kind are mapped onto consecutive subcarriers without an un-modulated DC subcarrier.

10. The apparatus according to claim 9, wherein each one of the plurality of synchronization signal sequences indicates cell-specific information; and
   wherein the processor further is configured to derive the cell-specific information from the plurality of synchronization signal sequences.

11. The apparatus according to claim 9, wherein the plurality of synchronization signal sequences are mapped to the time and frequency resource elements of the OFDM symbol such that the resulting synchronization signal sequence is centrally symmetric around a carrier frequency of the OFDM symbol, or each one of the plurality of synchronization signal sequences is centrally symmetric.

12. A non-transitory computer-readable storage medium, applied for a terminal, wherein the computer-readable storage medium has instructions, and the instructions executed on the terminal to perform operations of:
   mapping, by the terminal, a plurality of synchronization signal sequences to time and frequency resource elements of one Orthogonal Frequency Division Multiplex (OFDM) symbol, such that resulting synchronization signal sequences are centrally symmetric with respect to a carrier frequency of the one OFDM symbol, and wherein at least two of the plurality of synchronization signal sequences are of a first kind, and wherein synchronization signal sequences of the first kind are mapped onto consecutive subcarriers without an un-modulated DC subcarrier; and
   sending, by the terminal, a multi-carrier signal comprising the one OFDM symbol.

13. The non-transitory computer-readable storage medium according to the claim 12, wherein each one of the at least two synchronization signal sequences of the first kind is centrally symmetric.

14. The non-transitory computer-readable storage medium according to the claim 12, wherein the at least two synchronization signal sequences of the first kind are Primary Synchronization Signal (PSS) sequences or derived from PSS sequences, or Secondary Synchronization Signal (SSS) sequences or derived from SSS sequences.

15. The non-transitory computer-readable storage medium according to the claim 12,
   wherein each one of the at least two synchronization signal sequences of the first kind is mapped to a number of inconsecutive time and frequency resource elements; or
   wherein each one of the at least two synchronization signal sequences of the first kind is mapped to a number of consecutive time and frequency resource elements; or
   wherein at least one of the at least two synchronization signal sequences of the first kind is mapped to a number of inconsecutive time and frequency resource elements, and at least one another of the at least two synchronization signal sequences of the first kind is mapped to a number of consecutive time and frequency resource elements.

16. The non-transitory computer-readable storage medium according to the claim 12,
   wherein at least one another of the plurality of synchronization signal sequences is of a second kind.

* * * * *